United States Patent
Wright et al.

[15] 3,667,285
[45] June 6, 1972

[54] LEAK DETECTION SYSTEM

[72] Inventors: Edward L. Wright, Plainfield; Eugene T. Meseck, Lincoln Park, both of N.J.

[73] Assignee: Customline Control Products, Inc., Linden, N.J.

[22] Filed: Aug. 18, 1970

[21] Appl. No.: 64,736

[52] U.S. Cl. .................................................. 73/40.5
[51] Int. Cl. .............................. G01m 3/26, G01m 3/16
[58] Field of Search ................... 73/40, 40.5, 49.1, 194 R; 340/419, 239, 242; 235/151.34

[56] References Cited

UNITED STATES PATENTS

| | | | |
|---|---|---|---|
| 3,505,513 | 4/1970 | Fowler et al. | 73/40 X |
| 3,566,685 | 3/1971 | Zimmerman et al. | 73/194 R |
| 3,012,436 | 12/1961 | Meyers | 73/194 R |

*Primary Examiner*—Louis R. Prince
*Assistant Examiner*—William A. Henry, II
*Attorney*—Lerner, David & Littenberg

[57] ABSTRACT

A system is disclosed for detecting relatively small leaks in partially inaccessible pipelines having high throughputs. To detect the leaks information from a flow meter and pressure and temperature transducers at each end of the pipeline are fed over telephone lines to a central computation facility. At the computation center the temperature and pressure information is employed along with information stored in the computer to generate set points for a pair of counters. The computer then gates the outputs from the flow meters into the counters over an interval until both of the counters reach their set points. The computer than examines the numbers in the two counters to perform logical operations to determine if in fact, the pipeline is leaking. If a confirmed leak is detected a shut down procedure may be instituted.

12 Claims, 2 Drawing Figures

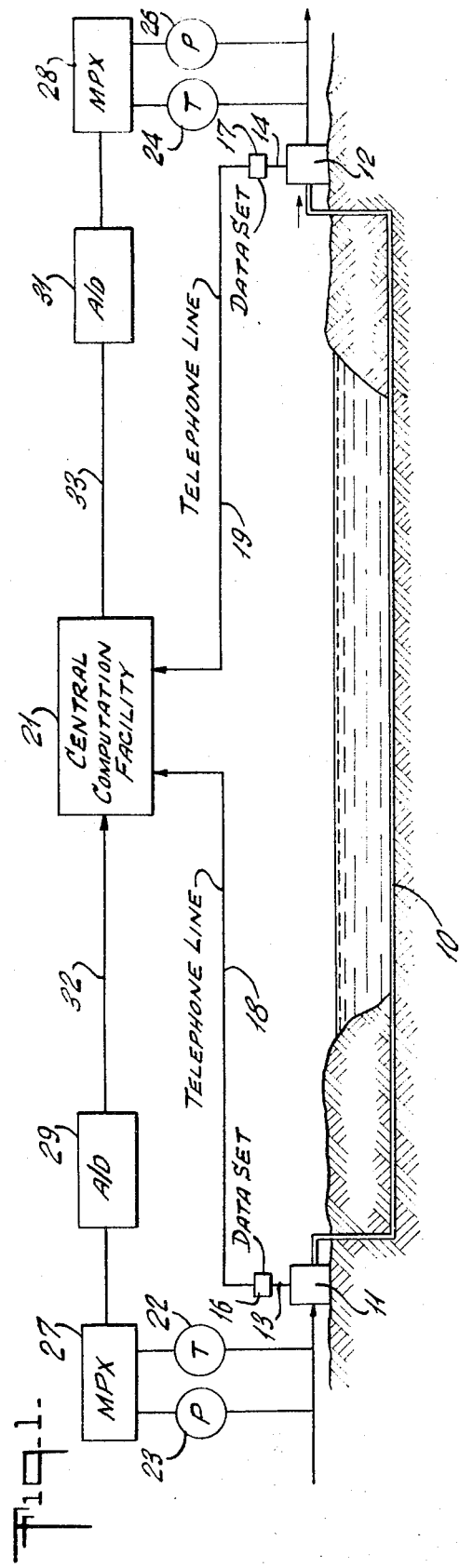
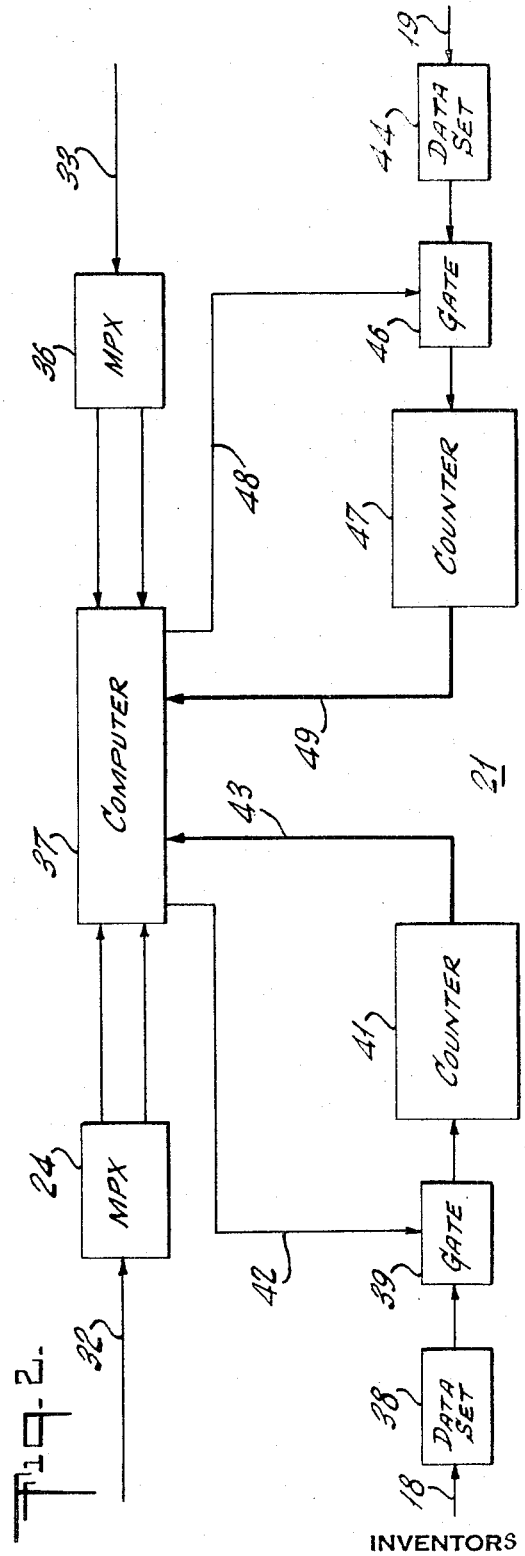
INVENTORS
EDWARD WRIGHT
EUGENE MESECK
BY
Lerner, David, & Littenberg
ATTORNEYS

LEAK DETECTION SYSTEM

FIELD OF THE INVENTION

This invention relates to leak detection systems and particularly to a leak detection system employed with partially inaccessible pipelines.

BACKGROUND OF THE INVENTION

A network of pipelines carrying diverse materials crisscrosses the country carrying products efficiently from suppliers to local distribution points. Many of these pipelines traverse rugged and often inaccessible terrain. Others are buried or pass under large bodies of water and are similarly inaccessible.

In recent years, concern has been expressed because inaccessible pipelines are not equipped with systems for detecting leaks sufficiently large to produce significant environmental pollution yet sufficiently small not to create economic hardship to the owner of the pipeline.

When the material carried by the pipeline is a highly inflammable substance, such as gas or oil, relatively small leaks can create fire hazards in addition to pollution problems. In response to this problem, the City of New York has established regulations requiring leak detection systems on inaccessible pipelines carrying certain substances. There is every reason to believe that other governmental bodies will institute such requirements with respect not only to highly inflammable substances but also those which present serious pollution potential.

One early leak detection system which has been employed in oil pipelines required the insertion of a "pig" into the pipeline. A "pig," is a cylinder with sleeves therein which is carried down the pipeline by material flowing therein. Sonic devices were attached to the pipe to listen for noises that could be attributed to leakage. In a variation of the "pig" system, the "pig" was timed to see how long it took to travel between two predetermined points. If the pig arrived late, it was assumed that a leak existed.

Both of these approaches were highly inaccurate and required long periods of time before it could be ascertained that a leak was present. Secondly, since the pig had to be inserted and extracted from the pipeline which involved extensive manual operations. Further, these tasks could not be done on a continuous basis. A third problem which accompanied these systems was the fact that the pigs themselves were inserted inside the pipeline disrupting normal pipeline operation and raising the possibility of contamination.

Another approach taken to leak detection in pipelines, employs a pair of flow meters, one at each end of the pipeline. After the pipeline had stable flow therein, the readings from the two meters were compared. If the relationship between the readings varied thereafter beyond a predetermined limit, a leak is assumed.

This system cannot detect leaks during a start-up operation which in a large pipeline may last for 8 hours. During such a start-up interval significant quantities of materials can be dispersed into the environment. A further disadvantage of this system arises because the no leak condition is determined by actual meter readings made after the start-up interval. If in fact a small leak exists, this leak will not be detected by the system but only changes in the size of the leak. If the temperature or pressure at either end of the pipeline is altered appreciably, this system will indicate a leak. Therefore, the system cannot be effectively used on pipelines carrying materials whose volumes are altered significantly over temperature and pressure ranges which can be expected in normal operation.

One prior art system has been built which compensated for volume changes at opposite ends of the pipeline in response to temperature and pressure variation. In this system, meter readings were multiplied by factors determined from temperature and pressure sensors. The compensated readings were applied to a differential integrating device which provided a signal equal to the accumulated long term difference between the two compensated meter readings. If this signal increased to a predetermined value within a specified interval, a leak was indicated. This system required frequent calibration of equipment to insure that systematic errors were not being integrated to provide leak signals. Even with the frequent calibration, the accuracy of the system and speed of response was limited.

Therefore, it is an object of this invention to provide a system for quickly and accurately detecting small leaks in large pipelines.

It is another object of this invention to provide a leak detection system for a pipeline which requires no foreign objects to be placed in the pipeline.

It is still another object of this invention to provide a leak detection system which compensates for temperature and pressure variations in materials flowing through the pipeline.

It is yet another object of this invention to provide a leak detection system which will detect leaks large enough to create fire or pollution hazards but yet are economically insignificant to the user of the pipeline.

It is a further object of this invention to provide a leak detection system which does not integrate systematic instrument error.

BRIEF DESCRIPTION OF THE INVENTION

With these and other objects in view, the present invention contemplates a system in which a pair of meters measure the volume of fluid going into and coming out of a pipeline. Since the volume of fluid going in and coming out of the pipeline is different even with no leak present, a function of temperature and pressure at the ends of the pipeline, a temperature and pressure sensor are located adjacent to each of the meters. To monitor for leaks, the ratio of the volume into the pipeline to the volume out of the pipeline is calculated which will indicate no leakage at the temperature and pressures at the ends thereof. A pair of whole numbers are then selected that represent the precalculated ratio between the two volumes. The maximum instrument error is employed in this calculation to select whole numbers sufficiently large so that the maximum error attributable to instrument errors is less than one whole number.

The whole numbers are used as set points for a pair of accumulators which accumulate the output signal from each of the meters respectively. When both of these accumulators have reached their set points, accumulation is inhibited. The numbers now stored in the two accumulators are examined to determine if in fact a leak is present.

DETAILED DESCRIPTION OF THE INVENTION

Referring now to FIG. 1, we see a section of pipeline 10 equipped with a leak detection system embodying the principles of this invention. The section 10 of the pipeline, by way of example, is shown running partially underground and partially under water to illustrate the problem of detecting leaks in pipelines which are inaccessible.

At each end of the section 10 of the pipeline is a flow meter 11 and 12 respectively. Each of the flow meters 11 and 12 provide a output signal on a lead 13 and 14 respectively which is applied to a data set 16 and 17 respectively. The data sets 16 and 17 are connected by telephone lines 18 and 19 to a central computation facility 21. The meters 11 and 12 are designed to provide digital signals having repetition rates such that a maximum number of pulses are provided per unit volume passing therethrough while maintaining a minimum upper frequency limit to more efficiently employ the bandwidth of the telephone lines 18 and 19. Since the repetition rate of the signals on the leads 13 and 14 indicate rate of flow, the total number of pulses appearing on one of the leads 13 and 14 over an interval of time is proportional to the volume which passes through the meter 11 and 12 respectively during that interval.

In the system of this invention, a leak is detected by comparing the quantity of fluid entering the section 10 of the pipeline through the meter 11, to the quantity of fluid leaving the section 10 of the pipeline, through the meter 12. The meters 11 and 12, however measuring flow rates and thereby volumes over time intervals, do not actually measure quantity, since the volume of fluid coming out of the section 10 of the pipeline through the meter 12 will be different from the volume of fluid going into the pipeline 10 through the meter 13 for the same quantity if the temperature and pressure of the fluid is different at the ends of the pipeline 10. Therefore, under normal operating conditions, the volume of fluid leaving the pipeline 10 through the meter 12 will be different than the fluid entering the pipeline through the meter 11 when the quantity of fluid leaving the pipeline 10 through the meter 12 is equivalent to the quantity of fluid entering the pipeline 10 through the meter 11.

To account for this, temperature and pressure transducers are mounted adjacent to each of the meters 11 and 12. A temperature and pressure transducer 22 and 23 respectively are shown schematically in FIG. 1, but in actuality, are mounted as close to the meter 11 as possible to measure the temperature and pressure of the fluid actually passing through the meter 11. In a like manner, temperature and pressure transducers 24 and 26 respectively are shown schematically adjacent to the meter 12. The output signals provided by the temperature and pressure transducers 22 and 24 and 23 and 26 respectively are combined by multiplexers 27 and 28 respectively. The output from the multiplexers 27 and 28 are fed through analog to digital converters 29 and 31 respectively and fed over low capacity transmission paths 32 and 33 to the central computation facility 21. The transmission paths 32 and 33 may be part of a voice channel in the telephone lines 18 and 19.

Referring now to FIG. 2, we see details of the central computation facility 21. The signals provided on the lines 32 and 33 are separated out by multiplex units 34 and 36 respectively to provide appropriate pressure and temperature information to a computer 37. The signal from the meter 11 transmitted over the telephone line 18 is decoded by a data set 38 passed through a gate 39 and accumulated in a counter 41. The gate 39 is controlled by a signal on a lead 42 to pass the information from the data set 38 to the counter 41 in accordance with signals generated by the computer 37. The count of the counter 41 is monitored by the computer 37 over leads 43.

In a like manner, the information from the meter 12 provided by the telephone line 19 is decoded by a data set 44 and passed by a gate 46 to a counter 47. The computer 37 controls the gate 46 over a line 48 and monitors the counter 47 on a group of leads 49.

In operation, the temperature and pressure information provided to the computer 37 is employed to generate signals which indicates what the ratio of pulse repetition rates provided by meters 11 and 12 should be if in fact equal quantities are passing therethrough. The computer then uses stored information based upon known errors in the system including meter hysteresis and time constants to generate two whole numbers to which the counters 41 and 47 should arrive at the same time if there is no leak in the pipeline 10. These numbers are chosen so that the known errors are less than one count and are sufficiently high so that one count represents less than the minimum leak to be detected.

The computer can perform these functions simply. The corrections for temperature and pressure merely involve multiplication and addition. To select the preset counts for the counters 41 and 47 a preselected whole number is chosen for the preset count of the counter 41 while the preset count for the counter 47 is calculated therefrom using the temperature and pressure information and other information stored or entered into the computer. If the calculated number does not meet all the requirements the preselected whole number is increased and the process is repeated.

After the whole numbers are selected, the computer applies enabling signals on the leads 42 and 48 to enable the gates 39 and 46 to pass the pulses from the meters 11 and 12 through to the counters 41 and 47. When the computer 37 has sensed that both of the counters 41 and 47 have arrived at the preselected whole numbers, the gates 39 and 46 are disabled. The computer then checks to see if the numbers provided on the leads 43 and 49 are in fact the preselected whole numbers. If they are, no leak is indicated.

If the number in the counter 41 is greater than its preset value, a leak is indicated because it was necessary to allow a greater quantity of fluid to flow through meter 11 to allow the predetermined quantity to pass through the meter 12 therefore some fluid must have left the pipe between the two meters 11 and 12.

This condition could of course be used to shut down the pipeline 10. Since however shutting down of a pipeline of this nature involved substantial cost, it would be desirable to run checks on the systems before shutdown if the leak is not above prescribed maximum allowable volume.

It should be clear that while this system is being described in a context for detecting leaks in a pipeline similar techniques can be employed to monitor the ratio of flow in two meters which are not at opposite ends of a pipeline.

In the present system a shutdown signal is not provided unless a leak is indicated on 20 successive cycles and the leak is greater than a predetermined size. Therefore, when a leak signal is indicated the computer begins to count successive leak signals. It also cumulatively stores the magnitude of the number by which the counter 41 has exceeded the preset count.

It should be clear that this number does not represent an absolute amount of leakage. Therefore information is stored in the computer indicating the conversion factor from counts to actual quantity of leakage. My copending U.S. Pat. application entitled Meter Proving System, Ser. No. 64,741 discloses a simple way for deriving this conversion factor periodically.

The computer gives an alarm signal when 20 successive leak signals are generated. If the cumulative amounts stored in the computer have not reached the predetermined size the computer can begin to check equipment to see if a valid leak is present, an operator may also run manual checks. Once however the cumulative count exceeds the predetermined size a shut down signal is generated.

In systems where different materials may be passed through the same pipeline at different times the computer is provided with information regarding the properties of the various materials. An operator then enters into the computer a code indicating which of the materials is then passing through the pipeline.

It should be clear that one computer can be employed to monitor several pipelines and that the cost per pipeline for leak detection will decrease as the number of pipelines, monitored increases within certain limits.

It should be understood that the embodiment described are merely illustrative of the principles of this invention that numerous others become obvious to those with ordinary skill in the art in light thereof.

We claim:

1. A system for monitoring a predetermined ratio of values of a property under test; said system including:
   first and second devices for providing first and second digital output signals respectively having pulse repetition rates dependent upon the derivative of said property and a physical condition, changes in said physical condition having a known effect on said repetition rates, said first and second devices having known errors;
   means for measuring said physical condition at said first device to provide a first correction signal;
   means for measuring said physical condition at said second device to provide a second correction signal;
   means responsive to said first and second correction signals for generating a corrected ratio signal indicative of said predetermined ratio of said values of said property;

first accumulating means for accumulating said first digital output signal over an interval to provide a first accumulative signal;

second accumulating means for accumulating said second digital output signal over said interval to provide a second accumulative signal; and means responsive to said corrected ratio signal and said known errors for determining said interval.

2. The system as defined in claim 1 in which said interval determining means includes:

means responsive to both said first and second accumulated signals exceeding first and second values respectively for terminating said interval.

3. The system as defined in claim 2 also including:

means operative at the termination of said interval for sensing said first and second accumulated signals; and means for comparing said first and second accumulated signals with said first and second values respectively for providing a leak indication signal.

4. The system as defined in claim 2 in which said first and second devices are flow meters, said property is volume of fluid and said physical condition is temperature of said fluid.

5. The system as defined in claim 4 also including:

means for measuring the pressure of said fluid at said first flow meter;

means for measuring the pressure of said fluid at said second flow meter; and said corrected ratio signal generating means is also responsive to said first and second pressure measuring means.

6. The system as defined in claim 5 also including:

a pipeline; and said first and second meters respectively are connected to measure flow in and out of said pipeline.

7. The system as defined in claim 6 also including:

a first communications channel; and said first digital signal is transmitted on said first communications channel to said first accumulating means.

8. The system as defined in claim 7 also including:

a second communication channel; and said second digital signal is transmitted over said second communications channel to said second accumulating means.

9. The system as defined in claim 8 also including:

means operative at the termination of said interval for sensing said first and second accumulated signals; and means for comparing said first and second accumulated signals with said first and second values respectively for providing a leak indication signal.

10. In a method of operating a system for monitoring a predetermined ratio of values of a property under test; said system including:

first and second devices for providing first and second digital output signals respectively having pulse repetition rates dependent upon the derivative of said property and a physical condition, changes in said physical condition having a known effect on said repetition rates, said first and second devices having known errors:

means for measuring said physical condition at said first device to provide a first correction signal;

means for measuring said physical condition at said second device to provide a second correction signal;

means responsive to said first and second correction signals for generating a corrected ratio signal indicative of said predetermined ratio of said values of said property;

first accumulating means for accumulating said first digital output signal over an interval to provide a first accumulative signal;

second accumulating means for accumulating said second digital output signal over said interval to provide a second accumulative signal;

means responsive to said corrected ratio signal and said known errors for determining said interval;

said interval determining means including:

means responsive to both said first and second accumulated signals exceeding first and second values respectively for terminating said interval;

said method including the steps of:

sensing said first and second accumulated signals at the end of said interval; and comparing said first and second accumulated signals with said first and second values respectively for providing a leak indication signal.

11. The method as defined in claim 10 including the additional step of:

counting said leak indication signals to provide an enabling signal.

12. The method as defined in claim 11 including the additional steps of:

integrating said first accumulated signal from said first value to provide a difference signal;

integrating said difference signal; and generating a shutdown signal if said integrated different signal reaches a predetermined value when said enabling signal is present.

* * * * *